US010954413B2

(12) United States Patent
Clapper

(10) Patent No.: US 10,954,413 B2
(45) Date of Patent: Mar. 23, 2021

(54) OPTICALLY CLEAR PRESSURE SENSITIVE ADHESIVE ARTICLE

(71) Applicant: 3M INNOVATIVE PROPERTIES COMPANY, St. Paul, MN (US)

(72) Inventor: Jason D. Clapper, Lino Lakes, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 118 days.

(21) Appl. No.: 15/324,925

(22) PCT Filed: Jul. 1, 2015

(86) PCT No.: PCT/US2015/038738
§ 371 (c)(1),
(2) Date: Jan. 9, 2017

(87) PCT Pub. No.: WO2016/014225
PCT Pub. Date: Jan. 28, 2016

(65) Prior Publication Data
US 2017/0198170 A1    Jul. 13, 2017

Related U.S. Application Data

(60) Provisional application No. 62/029,215, filed on Jul. 25, 2014.

(51) Int. Cl.
| C09J 7/38 | (2018.01) |
| C09J 7/40 | (2018.01) |
| C09J 5/06 | (2006.01) |
| C09J 133/08 | (2006.01) |
| C08K 9/06 | (2006.01) |
| B32B 7/12 | (2006.01) |
| B32B 37/12 | (2006.01) |
| B32B 38/00 | (2006.01) |

(52) U.S. Cl.
CPC ............... *C09J 7/385* (2018.01); *B32B 7/12* (2013.01); *B32B 37/12* (2013.01); *B32B 38/0008* (2013.01); *C09J 5/06* (2013.01); *C09J 7/40* (2018.01); *C09J 133/08* (2013.01); *B32B 2405/00* (2013.01); *B32B 2551/00* (2013.01); *C08K 9/06* (2013.01); *C09J 2203/318* (2013.01); *C09J 2301/122* (2020.08); *C09J 2301/302* (2020.08); *C09J 2301/312* (2020.08); *C09J 2301/408* (2020.08); *C09J 2301/416* (2020.08); *C09J 2433/00* (2013.01)

(58) Field of Classification Search
None
See application file for complete search history.

(56) References Cited

U.S. PATENT DOCUMENTS

| 2,801,185 | A | | 7/1957 | Iler |
| 4,455,205 | A | | 6/1984 | Olson et al. |
| 4,478,876 | A | | 10/1984 | Chung |
| 4,486,504 | A | | 12/1984 | Chung |
| 4,491,508 | A | | 1/1985 | Olson et al. |
| 4,522,958 | A | | 6/1985 | Das et al. |
| 4,737,559 | A | | 4/1988 | Kellen et al. |
| 5,258,225 | A | | 11/1993 | Katsamberis |
| 5,426,131 | A | | 6/1995 | Katsamberis |
| 5,665,156 | A | | 9/1997 | Ettlinger et al. |
| 5,711,797 | A | | 1/1998 | Ettlinger et al. |
| 5,814,685 | A | * | 9/1998 | Satake ............... C09D 11/326 347/100 |
| 5,820,988 | A | * | 10/1998 | Nagaoka ............ G02B 5/128 428/423.1 |
| 6,013,722 | A | * | 1/2000 | Yang .................. C09J 4/00 524/558 |
| 6,123,890 | A | | 9/2000 | Mazurek et al. |
| 6,440,553 | B2 | * | 8/2002 | Tokunaga ........... C09J 169/00 428/355 AC |
| 6,838,142 | B2 | | 1/2005 | Yang et al. |
| 7,070,051 | B2 | * | 7/2006 | Kanner ............. A61B 17/06133 206/382 |
| 7,247,796 | B2 | | 7/2007 | Hagen et al. |
| 7,494,708 | B2 | | 2/2009 | Everaerts et al. |
| 8,137,807 | B2 | | 3/2012 | Clapper et al. |
| 8,258,232 | B2 | | 9/2012 | Husemann et al. |
| 9,482,896 | B2 | * | 11/2016 | Kim .................. C08L 33/08 |
| 2006/0134362 | A1 | | 6/2006 | Lu et al. |
| 2013/0011683 | A1 | * | 1/2013 | Busman ............. C09D 133/04 428/423.1 |

(Continued)

FOREIGN PATENT DOCUMENTS

| WO | WO 99/37728 | 7/1999 |
| WO | WO 2005/073983 | 8/2005 |

(Continued)

OTHER PUBLICATIONS

Aldrich Data Sheet (2018).*
Frahn, "Surface Modified Fumed Silicas," European Coatings Journal, 2001, 5 pages.
International Search Report for PCT International Application No. PCT/US2015/038738, dated Sep. 24, 2015, 4 pages.

*Primary Examiner* — Frank D Ducheneaux

(57) ABSTRACT

An optically clear pressure sensitive adhesive article is described herein that includes a pressure sensitive adhesive film disposed on a substrate. The pressure sensitive adhesive film includes an optically clear adhesive composition formed by polymerizing a mixture of monomers that includes at least one (C1-C18)alkyl (meth)acrylate monomer and at least one polar (meth)acrylate monomer, and surface-modified fumed silica disposed in the optically clear pressure sensitive adhesive composition. The pressure sensitive adhesive film has a haze value in a range of 0 to 5% and a visible light transmittance value of 85 to 100%. Methods for making an optically clear pressure sensitive adhesive article are also described.

8 Claims, No Drawings

(56) References Cited

U.S. PATENT DOCUMENTS

| | | | |
|---|---|---|---|
| 2013/0034713 A1* | 2/2013 | Busman | G02B 1/04 428/217 |
| 2013/0170218 A1* | 7/2013 | Wolk | G02B 6/0036 362/296.01 |
| 2013/0244030 A1* | 9/2013 | Igarashi | C09J 123/22 428/355 EN |
| 2013/0296578 A1 | 11/2013 | Amano et al. | |
| 2014/0166575 A1 | 6/2014 | Bose et al. | |
| 2014/0377554 A1* | 12/2014 | Cho | C09J 123/22 428/355 EN |

FOREIGN PATENT DOCUMENTS

| | | |
|---|---|---|
| WO | WO 2010/078346 | 7/2010 |
| WO | WO 2013/156337 | 10/2013 |
| WO | WO 2013/181030 | 12/2013 |
| WO | WO 2014/015119 | 1/2014 |

* cited by examiner

OPTICALLY CLEAR PRESSURE SENSITIVE ADHESIVE ARTICLE

CROSS REFERENCE TO RELATED APPLICATIONS

This application is a national stage filing under 35 U.S.C. 371 of PCT/US2015/038738, filed Jul. 1, 2015, which claims the benefit of U.S. Provisional Application No. 62/029,215, filed Jul. 25, 2014, the disclosures of which are incorporated by reference in their entireties herein.

BACKGROUND

The present disclosure generally relates to optically clear pressure sensitive adhesives (PSAs) that include surface-modified fumed silica. The present disclosure more particularly relates to optically clear PSA articles that include surface-modified fumed silica for use with optical elements.

Optically clear adhesives (OCAs) are currently used in a variety of electronic display applications and serve an important role in the display's performance. The material's primary function is to improve optical quality by eliminating air gaps between the multicomponent layers of the display assembly that can lead to light diffraction, and in turn, increase the brightness and contrast of the display. Many of the material requirements of OCAs are very challenging given the ever evolving nature of display technology with rapidly changing component layers and features. OCAs not only are required to form a good adhesive bond with a multitude of substrates that make up the adjacent layers in the assembly, but also need to have excellent conformability to all of the various relief features of the assembly. For example, electronic display assemblies often have very sharp, 3D features such as printed ink steps in which the OCA must be able to conform to and adjust to without leaving air gaps or bubbles. Furthermore, industry trends toward requiring taller 3D features have generated a need for lower modulus, less elastic, and more conformable OCAs. To address this, previous work has focused on creating very "soft" OCA materials with greater viscous than elastic behavior and ultimately greater conformability. However, increasing the viscous characteristic of a PSA may have a detrimental impact on the ability to die-cut or handle die-cut piece parts of the OCA as well as the ability to remove specific carrier liners without damaging the OCA. Thus, a balance of conformability and handle-ability is needed to optimize the OCA for these challenging applications.

SUMMARY

In the current disclosure, base acrylic OCA systems are described that include surface-modified fumed silica fillers, resulting in unique and desirable material properties that result from the addition of these fillers. Most notably, a significant increase in the modulus and handle-ability of these filled OCA systems was observed while simultaneously achieving a high level of conformability and lamination performance. Traditional methods to improve modulus or handle-ability by raising Tg or inducing more crosslinking within the network often elicit a trade-off in the conformability and lamination performance in challenging display assemblies. However, the addition of fumed silica to a typical OCA formulation was observed to significantly increase modulus without altering either the Tg of the material or the ability of the material to relieve stress, a measure of the conformability and expected lamination performance in challenging applications.

Additionally, other unique phenomena were observed where as little as 1% addition of the correct hydrophobic grade surface-modified fumed silica significantly improved the release of a carrier liner by decreasing the average release force of the OCA from the liner.

Overall, by creating a good dispersion of surface-modified fumed silica particles within the OCA formulation and selecting the correct hydrophobic surface treatment on the fumed silica for that particular formulation, minimal changes in critical properties such as the optical performance of the OCA film was observed. This unique property relationship allows us to design an OCA with extremely good conformability for extreme lamination cases, retain sufficient modulus to induce good handle-ability and die-cutting, and keep critical optical properties for the desired display application. In this disclosure, we will demonstrate the effectiveness of the fumed silica additives within a given OCA formulation to increase the modulus and tensile characteristics of the film, decrease elongation, and decrease carrier release force all without significantly altering critical performance metrics such as optical clarity, stress relaxation, glass transition temperature, and ultimately the excellent room temperature lamination performance of the standard material.

In one aspect, the present disclosure describes a pressure sensitive adhesive article that includes a substrate, and a pressure sensitive adhesive film disposed on the substrate, wherein the pressure sensitive adhesive film includes an optically clear adhesive composition and surface-modified fumed silica disposed in the optically clear pressure sensitive adhesive composition. The optically clear adhesive composition is formed by polymerizing a mixture of monomers comprising at least one (C1-C18)alkyl (meth)acrylate monomer and at least one polar (meth)acrylate monomer. In some embodiments, the pressure sensitive adhesive film has a haze value in a range of 0 to 5%, and a visible light transmittance value of 85 to 100%.

In another aspect, the present disclosure describes a method of forming an optically clear pressure sensitive adhesive article, the method including polymerizing a mixture of monomers, the mixture of monomers including at least one (C1-C18)alkyl (meth)acrylate monomer and at least one polar (meth)acrylate monomer. The method further comprises combining the pressure sensitive adhesive composition with a surface-modified fumed silica to form an optically clear pressure sensitive adhesive film, and disposing the optically clear pressure sensitive adhesive film on an optically clear substrate to form an optically clear pressure sensitive adhesive article.

Optically clear pressure sensitive adhesive articles of the present disclosure are useful, for example, in electronic display applications.

DETAILED DESCRIPTION

Optically clear PSAs disclosed herein are applicable to a variety of application areas including those in which an optical film is adhered to a substrate, including, for example, electronic display, architectural, transportation, and photonics applications. In some embodiments, the optically clear PSA adheres optical film to optical displays, such as liquid crystal displays, as well as other devices containing optical film. These examples, and the examples discussed below, provide an appreciation of the applicability of the disclosed PSAs, but should not be interpreted in a limiting sense.

The term "surface-modified fumed silica" refers to fumed silica (generally, agglomerated silica nanoparticles as opposed to non-agglomerated silica nanoparticles) wherein the surface has been altered either by chemical reactions or through other mechanisms.

The term "fumed silica" (also known as "pyrogenic silica", because it is typically produced in a flame), refers to amorphous silica primary particles (e.g., silica nanoparticles) fused into branched, chainlike, three-dimensional secondary particles which then agglomerate into larger tertiary particles. The resulting fumed silica material, in the form of a powder, typically has an extremely low bulk density and high surface area.

Unless otherwise indicated, the term "polymer" will be understood to include polymers, copolymers (e.g., polymers formed using two or more different monomers), oligomers and combinations thereof, as well as polymers, oligomers, or copolymers that can be formed in a blend by, for example, coextrusion or reaction. Both block and random copolymers are included, unless indicated otherwise.

Unless otherwise indicated, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition.

Unless otherwise indicated, "optically clear" refers to an article that has a high light transmittance over at least a portion of the visible light spectrum (about 400 to about 700 nm), and that exhibits low haze.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, wt. %, wt. %, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to a composition containing "an adhesive layer" encompass embodiments having one, two or more adhesive layers. As used in this specification and the appended claims, the term "or" is generally employed in its sense including "and/or" unless the content clearly dictates otherwise.

This disclosure generally describes pressure sensitive adhesives that include fumed silica. In some embodiments the fumed silica is surface-modified. The pressure sensitive adhesives containing fumed silica can be optically clear. In some embodiments, the pressure sensitive adhesive that include surface-modified fumed silica provide a significant increase in the modulus and handle-ability of these filled OCA systems while simultaneously achieving a high level of conformability and lamination performance.

The pressure sensitive adhesives can be formed by combining surface-modified fumed silica with a polymer formed from an (meth)acrylate monomer or a mixture of (meth) acrylate monomers and then optionally cross-linking or curing to form the pressure sensitive adhesive film. The pressure sensitive adhesive can also be formed by blending surface-modified fumed silica with an acrylic pressure sensitive adhesive solution, followed by coating, drying, and curing or crosslinking. The pressure sensitive adhesive film can be utilized to adhere an optical element such as, for example, an optical film, to another element.

Prior to forming the film, a pressure sensitive adhesive composition containing surface-modified fumed silica can be applied to a substrate using a variety of coating methods including, for example, spin coating, web coating, transfer coating, die coating, screen printing, electrospraying, and curtain coating. In some embodiments the substrate is a release liner or includes a release liner. In some embodiments the substrate is or includes an optical film such as a reflective polarizer or mirror film, for example.

The disclosed pressure sensitive adhesive films including surface-modified fumed silica can be optically clear, having low haze. In some embodiments, a layer of specified thickness (e.g. 200 micrometers dry thickness) of a disclosed PSA has a haze value of no more than 10%, and is preferably in a range from 0 to 5%, 0 to 3%, or even 0 to 1%. A method for determining haze is described in the Example section below.

The disclosed pressure sensitive adhesive film including surface-modified fumed silica can be optically clear, also having a high light transmittance over at least a portion of the visible spectrum. In some embodiments, a layer of specified thickness (e.g. 200 micrometers dry thickness) of a disclosed PSA has a visible light transmittance value, over at least a portion of the visible light spectrum, of at least 50%, and is preferably in a range from 75 to 100%, 85 to 100%, or even 90 to 100%. The disclosed PSA films are capable of exhibiting a substantially colorless appearance, having a substantially uniformly high light transmittance over the visible spectrum.

The pressure sensitive adhesive film can have any useful thickness such as, for example, 5 to 100 micrometers, or 5 to 50 micrometers, or 5 to 25 micrometers. A method for determining light transmission is described in the Example section below.

In some embodiments, the optically clear pressure sensitive adhesive film includes polyacrylate pressure sensitive adhesives. The Pressure-Sensitive Tape Council has defined pressure sensitive adhesives as materials with the following properties: (1) aggressive and permanent tack, (2) adherence with no more than finger pressure, (3) sufficient ability to hold onto an adherent, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. Known polymers for preparing PSAs are natural rubber-, synthetic rubber- (e.g., styrene/butadiene copolymers (SBR) and styrene/isoprene/ styrene (SIS) block copolymers), silicone elastomer-, poly alpha-olefin-, and various (meth)acrylate- (e.g., acrylate, methacrylate, or mixtures thereof) based polymers. Of these, (meth)acrylate-based polymer PSAs are an exemplary class of PSA for use with the disclosed adhesives due to their optical clarity, permanence of properties over time (aging stability), and versatility of adhesion levels, to name just a few of their benefits.

Examples of useful (meth)acrylate monomers for preparing a poly(meth)acrylate pressure sensitive adhesive include specifically, but not exclusively, the following classes:

Class A—includes acrylic acid esters of an alkyl alcohol, the alcohol containing from 2 to 18 or from 4 to 18 carbon atoms and include, for example ethyl acrylate, isopropyl acrylate, isoamyl acrylate, sec-butyl acrylate, n-butyl acrylate, 2-methylbutyl acrylate, 4-methyl-2-pentyl acrylate, 2-(ethyl)hexyl acrylate, isooctyl acrylate and mixtures thereof. Of these, isooctyl acrylate, n-butyl acrylate 2-octyl-1-decyl acrylate, 2-(ethyl)hexyl acrylate, and 2-ethylhexyl methacrylate are exemplary. As homopolymers, these acrylate esters generally have glass transition temperatures of below about 0 degrees Celsius.

Class B—includes (meth)acrylate or other vinyl monomers which, as homopolymers, have glass transition temperatures of greater than about 0 degrees Celsius, for example, methyl acrylate, methyl methacrylate, ethyl methacrylate, isopropyl methacrylate, tert-butyl acrylate, isobornyl (meth)acrylate, butyl methacrylate, vinyl acetate, vinyl esters, and mixtures thereof. The class B monomers can be used in a pressure sensitive adhesive to vary Tg and modulus of the adhesives.

Class C—includes polar monomers such as (meth)acrylic acid; (meth)acrylamides such as N-alkyl (meth)acrylamides and N,N-dialkyl (meth)acrylamides; hydroxy alkyl (meth)acrylates; and N-vinyl lactams such as N-vinyl pyrrolidone and N-vinyl caprolactam; 2-(dimethylamino)ethyl (meth)acrylate, 2-(diethylamino)ethyl (meth)acrylate, and 3-(dimethylamino)propyl (meth)acrylate; acrylonitrile. Polar monomers also include hydroxy functional (meth)acrylates such as hydroxyethyl (meth)acrylate, hydroxypropyl (meth)acrylate, and hydroxybutyl (meth)acrylate as examples. The polar monomers can be included in the PSA compositions to adjust the Tg or the cohesive strength of the adhesive. Additionally, the polar monomers can function as reactive sites for chemical or ionic crosslinking, if desired.

Class D (Crosslinkers)—In order to increase cohesive strength of the poly(meth)acrylate pressure sensitive adhesives, a crosslinking additive may be incorporated into the PSAs. Two main types of crosslinking additives are exemplary. The first crosslinking additive is a thermal crosslinking additive such as multifunctional aziridine, isocyanate and epoxy. Common polyfunctional isocyanate crosslinkers are trimethylolpropane toluene diisocyanate, toluene diisocyanate, etc. Such chemical crosslinkers can be added into solvent-based PSAs after polymerization and activated by heat during oven drying of the coated adhesive. In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents. The second type of crosslinking additive is a photosensitive crosslinker, which is activated by high intensity ultraviolet (UV) light. Two common photosensitive crosslinkers used for acrylic PSAs are benzophenone and copolymerizable aromatic ketone monomers as described in U.S. Pat. No. 4,737,559 (Kellen et al.) Another photocrosslinker, which can be post-added to the solution polymer and activated by UV light is a triazine, for example, 2,4-bis (trichloromethyl)-6-(4-methoxy-phenyl)-s-triazine. These crosslinkers are activated by UV light generated from sources such as medium pressure mercury lamps or a UV blacklight. Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents. Crosslinking may also be achieved using high energy electromagnetic radiation such as gamma or e-beam radiation. In this case, no crosslinker may be required.

Class E (Additives)—Following copolymerization, other additives may be blended with the resultant poly(meth) acrylate pressure sensitive adhesives. For example, compatible tackifiers and/or plasticizers may be added to aid in optimizing the ultimate modulus, Tg, tack and peel properties of the PSA. The use of such tack-modifiers is known. Examples of useful tackifiers include, but are not limited to, rosin, rosin derivatives, polyterpene resins, coumarone-indene resins, and the like. Plasticizers, which may be added to the disclosed adhesives, may be selected from a wide variety of commercially available materials. In each case, the added plasticizer should be compatible with the PSA. Representative plasticizers include polyoxyethylene aryl ether, dialkyl adipate, 2-ethylhexyl diphenyl phosphate, 4-(t-butyl)phenyl diphenyl phosphate, bis(2-ethylhexyl) adipate, toluenesulfonamide, dipropylene glycol dibenzoate, polyethylene glycol dibenzoate, polyoxypropylene aryl ether, bis(butoxyethoxyethyl) formal, and bis(butoxyethoxyethyl) adipate.

The disclosed PSAs can be prepared by solution polymerization, emulsion polymerization, bulk polymerization, and the like. Adhesive properties of the pressure sensitive adhesives are to a great extent influenced by the compositions and ratios of the monomers chosen for copolymerization as described above in the Classes A to C. The PSA properties can be further modified, by adding crosslinker and additive as described above in the Classes D and E.

In some embodiments, an optically clear pressure sensitive adhesive film is formed by combining surface-modified fumed silica with a pressure sensitive adhesive formed by polymerizing a mixture of monomers comprising 50 wt. % to 94 wt. % of at least one (C1-C18)alkyl (meth)acrylate monomer, 5 wt. % to 30 wt. % of at least one polar (meth)acrylate monomer, and 1 wt. % to 20 wt. % of a (meth)acrylamide, where each weight percentage of monomer is relative to a total weight of monomers in the mixture of monomers.

In some embodiments, an optically clear pressure sensitive adhesive film is formed by combining surface-modified fumed silica with a pressure sensitive adhesive comprising an alkyl acrylate such as 2-ethylhexyl acrylate and polar acrylate monomers such as hydroxypropyl acrylate and acrylamide, and forming an optically clear pressure sensitive adhesive film. In some other embodiments, an optically clear pressure sensitive adhesive film is formed by combining surface-modified fumed silica with a pressure sensitive adhesive comprising 50 wt. % to 60 wt. % 2-ethylhexyl acrylate, 10 wt. % to 20 wt. % 2-ethylhexyl methacrylate, 10 wt. % to 25 wt. % hydroxypropyl acrylate, and 1 wt. % to 10 wt. % acrylamide, where each weight percentage of monomer is relative to a total weight of monomers, and coating and drying the composition to form an optically clear pressure sensitive adhesive film. In some embodiments, an optically clear pressure sensitive adhesive film is formed by combining surface-modified fumed silica with a pressure sensitive adhesive comprising 2-ethylhexyl acrylate, 2-hydroxyethyl acrylate, and diacetone acrylamide, and forming an optically clear pressure sensitive adhesive film. In some embodiments, an optically clear pressure sensitive adhesive film is formed by combining surface-modified fumed silica with a pressure sensitive adhesive comprising 50 wt. % to 60 wt. % 2-ethylhexyl acrylate, 10 wt. % to 20 wt. % 2-hydroxyethyl acrylate, and 5 wt. % to 15 wt. % diacetone acrylamide, where each weight percentage of monomer is relative to a total weight of monomers, and coating and drying the composition to form an optically clear pressure sensitive adhesive film.

Surface-modified fumed silica is included in the optically clear pressure sensitive adhesive film in any useful amount. The pressure sensitive adhesive film can include from 1 to 70 wt. % surface-modified fumed silica, or from 5 to 70 wt. %, or from 10 to 60 wt. %, relative to a total weight of the pressure sensitive adhesive film. It is understood that the surface-modified fumed silica loading on a wt. % basis will be affected by the density of the surface-modified fumed silica.

The surface-modified fumed silica has surface groups that modify the solubility characteristics of the fumed silica particles. The surface groups are selected to render the particle compatible with the pressure sensitive adhesive composition. When the composition is polymerizable, for example, the surface groups can be selected to associate or react with at least one component of the pressure sensitive adhesive composition to become part of the polymer network of the pressure sensitive adhesive composition.

The surface groups are present on the surface of the fumed silica in an amount sufficient to provide surface-modified fumed silica particles that are capable of being subsequently dispersed in the pressure sensitive adhesive composition without aggregation. The surface groups preferably are present in an amount sufficient to form at least a monolayer, preferably a continuous monolayer, on the surface of the fumed silica particles.

Surface modifying groups may be derived from surface modifying agents. Schematically, surface modifying agents can be represented by the formula A-B, where the A group is capable of attaching to the surface of the particle and the B group is a compatibilizing group that may be reactive or non-reactive with a component of the composition. Compatibilizing groups can be selected to render the particle relatively more polar, relatively less polar or relatively non-polar.

Suitable classes of surface-modifying agents include, e.g., silanes, organic acids organic bases, and alcohols. Particularly useful surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, isooctyltriethoxysilane phenyltriethoxysilane, phenyltrimethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltris(t-butoxy)silane, vinyltris(isobutoxy)silane, vinyltris(isopropenoxy)silane and vinyltris(2-methoxyethoxy)silane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; silane functional (meth)acrylates including, e.g., 3-(methacryloyloxy)propyltrimethoxysilane, 3-acryloyloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane, hexamethylene disilizane, and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Methods of surface-modifying silica using silane functional (meth)acrylates are described, e.g., in U.S. Pat. No. 4,491,508 (Olson et al.,) and U.S. Pat. No. 4,455,205 (Olson et al.,) U.S. Pat. No. 4,478,876 (Chung) and U.S. Pat. No. 4,486,504 (Chung) and U.S. Pat. No. 5,258,225 (Katsamberis).

Useful organic acid surface-modifying agents include, e.g., oxyacids of carbon (e.g., carboxylic acid), sulfur and phosphorus, and combinations thereof. Representative examples of polar surface-modifying agents having carboxylic acid functionality include $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA) and mono(polyethylene glycol) succinate.

Representative examples of non-polar surface-modifying agents having carboxylic acid functionality include octanoic acid, dodecanoic acid and oleic acid.

Examples of suitable phosphorus containing acids include phosphonic acids including, e.g., octylphosphonic acid, laurylphosphonic acid, decylphosphonic acid, dodecylphosphonic acid and octadecylphosphonic acid.

Useful organic base surface-modifying agents include, e.g., alkylamines including, e.g., octylamine, decylamine, dodecylamine and octadecylamine.

Examples of other useful non-silane surface modifying agents include acrylic acid, methacrylic acid, beta-carboxyethyl acrylate, mono-2-(methacryloyloxyethyl) succinate, and combinations thereof. A useful surface modifying agent that imparts both polar character and reactivity to the fumed silica particles is mono(methacryloyloxypolyethyleneglycol) succinate.

Examples of suitable surface-modifying alcohols include, e.g., aliphatic alcohols including, e.g., octadecyl, dodecyl, lauryl and furfuryl alcohol, alicyclic alcohols including, e.g., cyclohexanol and aromatic alcohols including, e.g., phenol and benzyl alcohol, and combinations thereof.

A variety of methods are available for modifying the surface of fumed silica particles including, e.g., adding a surface modifying agent to fumed silica particles (e.g., in the form of a powder or a colloidal dispersion) and allowing the surface modifying agent to react with the fumed silica particles. Other useful surface modification processes are described in, e.g., U.S. Pat. No. 2,801,185 (Iler) and U.S. Pat. No. 4,522,958 (Das et al.).

Useful surface-modified fumed silica include fumed silica surface-modified with silane surface modifying agents including, e.g., acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, phenyltrimethoxysilane, and combinations thereof. Fumed silica can be treated with a number of surface modifying agents including, e.g., alcohol, organosilane including, e.g., alkyltrichlorosilanes, trialkoxyarylsilanes, trialkoxy(alkyl)silanes, and combinations thereof and organozirconates, organotitanates and mixtures thereof.

Suitable, commercially available surface treated fumed silica that can be used in the present invention include "CAB-O-SIL TS-530 TREATED FUMED SILICA" (a hexamethyldisilazane treated hydrophobic fumed silica), "CAB-O-SIL TS-610 TREATED FUMED SILICA" (a dimethyldichlorosilane treated hydrophobic fumed silica), and "CAB-O-SIL TS-720 TREATED FUMED SILICA" (a dimethyl silicone fluid treated hydrophobic fumed silica), from Cabot Corporation of Tuscola, Ill. Other suitable, commercially available surface treated fumed silica include "AEROSIL R-104", "AEROSIL R-106", "AEROSIL R-805", "AEROSIL R-812", "AEROSIL R-812s", "AEROSIL R-816", "AEROSIL R-972" and "AEROSIL R-974" fumed silicas, available from Evonic Industries, Essen, Germany. The fumed silicas listed above are substantially hydrophobic after surface treatment.

Some methods of making surface-modified fumed silica are described, for example, in U.S. Pat. No. 5,665,156 (Ettlinger et al.) and U.S. Pat. No. 5,711,797 (Ettlinger et al.), as well as in U.S. Patent Application Publication Nos. 2013/0296578 (Amano et al.) and 2014/0166575 (Bose et al.).

Various methods may be employed to combine the surface-modified fumed silica and the pressure sensitive adhesive composition. In one method, a dispersion of surface-modified fumed silica particles in a solvent and pressure sensitive adhesive are combined. Solvent present in the composition is then removed, leaving the surface-modified fumed silica dispersed in the pressure sensitive adhesive composition. The solvent may be removed by evaporation including, e.g., distillation, rotary evaporation or oven drying. Optionally, for some dispersions, e.g., aqueous dispersions of surface-modified fumed silica particles, prior to addition of the pressure sensitive adhesive composition, a co-solvent (e.g., methoxy-2-propanol or N-methylpyrrolidone) may be added to the aqueous dispersion to assist removal of water. After the pressure sensitive adhesive composition is added, the water and co-solvent can be removed.

Another method for incorporating surface-modified fumed silica particles into a pressure sensitive adhesive composition includes providing surface-modified fumed silica powder (e.g., by drying a dispersion of surface-modified fumed silica in a solvent), followed by addition of the pressure sensitive adhesive composition or at least one component of the pressure sensitive adhesive composition into which the surface-modified fumed silica particles are to be dispersed. The drying step may be accomplished by conventional means such as oven drying or spray drying.

Dried fumed silica particles may also be introduced into either a solvated pressure sensitive adhesive composition or a pre-polymerized adhesive composition through high speed shear mixing (e.g., using a COWLES blade mixer). Once adequately dispersed in the polymer solution or pre-polymer mixture, the adhesive may be coated and either dried or polymerized on web to form the pressure sensitive adhesive article with incorporated fumed silica.

The optically clear pressure sensitive adhesive films described herein can be used to adhere an optical film to another optical element such as, for example, another optical film or a substrate, whether made of glass, polymer, or other material.

A variety of materials and methods can be used to make the optical film elements described herein. Any polymeric material capable of possessing the optical properties described herein is contemplated. A partial listing of these polymers include, for example, polyolefins, polyacrylates, polyesters, polycarbonates, fluoropolymers, polyimides, and the like. One or more polymers can be combined to form the polymeric optical film.

Polyolefins include for example: cyclic olefin polymers such as, for example, polycyclohexane, polynorbornene and the like; polypropylene; polyethylene; polybutylene; polypentylene; and the like. A specific polybutylene is poly(1-butene). A specific polypentylene is poly(4-methyl-1-pentene). The polymeric material described herein can be capable of forming a crystalline or semi-crystalline material. The polymeric material described herein may also be capable of forming a non-crystalline material.

Polyesters can include, for example, poly(ethylene terephthalate) or poly(ethylene naphthalate). The polymeric material described herein can be capable of forming a crystalline or semi-crystalline material. The polymeric material described herein may also be capable of forming a non-crystalline material.

Polyacrylates include, for example, acrylates, methacrylates and the like. Examples of specific polyacrylates include poly(methyl methacrylate), and poly(butyl methacrylate).

Fluoropolymer specifically includes, but is not limited to, poly(vinylidene fluoride).

The optical film with the PSA described herein can be used with a variety of other components and films that enhance or provide other properties to an optical element. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors. In some embodiments, the optical film is or includes an optical compensation film.

The PSA films disclosed herein can take the physical form of a simple layer with substantially planar opposed major surfaces. Alternatively, they can be made in the form of a layer with a structured (e.g., grooved) major surface so that as the adhesive is applied to the surface of an optical element, air can more easily escape or bleed out from between the PSA and the surface of the optical element during application. Sufficient pressure is applied to collapse the features of the structured surface so that after application, the PSA film has substantially planar opposed major surfaces, and air entrapment between the PSA and optical element is avoided. Such structured surfacing of adhesive films is disclosed, for example, in U.S. Pat. No. 6,123,890 (Mazurek et al.), and U.S. Pat. No. 6,838,142 (Yang et al.).

In most cases, the optically clear PSA films disclosed herein are substantially colorless, i.e., they have low haze and a uniformly high transmission over substantially the entire visible spectrum. In some cases, however, the optically clear PSA films can comprise one or more dyes, pigments, or colorants to provide the PSA film with a desired color (e.g., blue, green, or red) or to adjust the color of the PSA film to a desired color point. Preferably, such dyes, pigments, or other colorants are chosen to maintain the low haze properties of the PSA film.

Select Embodiments of the Present Disclosure

Item 1. A pressure sensitive adhesive article comprising: a substrate; a pressure sensitive adhesive film disposed on the substrate; wherein the pressure sensitive adhesive film comprises: an optically clear adhesive composition formed by polymerizing a mixture of monomers comprising at least one (C1-C18)alkyl (meth)acrylate monomer and at least one polar (meth)acrylate monomer; and surface-modified fumed silica disposed in the optically clear pressure sensitive adhesive composition; wherein the pressure sensitive adhesive film has a haze value in a range of 0 to 5% and a visible light transmittance value of 85 to 100%.

Item 2. The pressure sensitive adhesive article of item 1, wherein the pressure sensitive adhesive film has a haze value of 0% to 3%.

Item 3. The pressure sensitive adhesive article according to item 1, wherein the surface-modified fumed silica comprises alkylsilane surface-modifying groups.

Item 4. The pressure sensitive adhesive article according to item 1, wherein the surface-modified fumed silica is present in a range from 1 wt. % to 60 wt. % relative to a total weight of the of the pressure sensitive adhesive film.

Item 5. The pressure sensitive adhesive article of item 1, wherein the mixture of monomers comprises: 50 wt. % to 94 wt. % of the at least one (C1-C18)alkyl (meth)acrylate monomer; 5 wt. % to 30 wt. % of the at least one polar (meth)acrylate monomer; and 1 wt. % to 20 wt. % of a (meth)acrylamide; wherein each weight percentage of monomer is relative to a total weight of monomers in the mixture of monomers.

Item 6. The pressure sensitive adhesive article of item 1, wherein the mixture of monomers comprises: 50 wt. % to 60 wt. % 2-ethylhexyl acrylate, 10 wt. % to 20 wt. % 2-ethylhexyl methacrylate, 10 wt. % to 25 wt. % hydroxypropyl acrylate, and 1 wt. % to 10 wt. % acrylamide, where each weight percentage of monomer is relative to a total weight of monomers.

Item 7. The pressure sensitive adhesive article of item 1, wherein the mixture of monomers comprises: 50 wt. % to 60 wt. % 2-ethylhexyl acrylate, 10 wt. % to 20 wt. % 2-hydroxyethyl acrylate, and 5 wt. % to 15 wt. % diacetone acrylamide.

Item 8. The pressure sensitive adhesive article of item 1, wherein the mixture of monomers further comprises a crosslinking additive.

Item 9. The pressure sensitive adhesive article of item 8, wherein the crosslinking additive is a thermal crosslinking additive.

Item 10. The pressure sensitive adhesive article of item 8, wherein the crosslinking additive is a photosensitive crosslinker additive.

Item 11. The pressure sensitive adhesive article of item 1, wherein the pressure sensitive adhesive film further comprises a tackifier.

Item 12. The pressure sensitive adhesive article of item 1, wherein the surface modifying group is an organosilane.

Item 13. The pressure sensitive adhesive article of item 1, wherein the substrate is a release liner.

Item 14. A method of forming an optically clear pressure sensitive adhesive article comprising the steps of: polymerizing a mixture of monomers comprising at least one (C1-C18)alkyl (meth)acrylate monomer and at least one polar (meth)acrylate monomer; combining the pressure sensitive adhesive composition with a surface-modified fumed silica to form an optically clear pressure sensitive adhesive film; and disposing the optically clear pressure sensitive adhesive film on an optically clear substrate to form an optically clear pressure sensitive adhesive article.

Item 15. The method of item 14, wherein the mixture of monomers comprises: 50 wt. % to 94 wt. % of the at least one (C1-C18)alkyl (meth)acrylate monomer; 5 wt. % to 30 wt. % of the at least one polar (meth)acrylate monomer; and 1 wt. % to 20 wt. % of a (meth)acrylamide; wherein each weight percentage of monomer is relative to a total weight of monomers in the mixture of monomers.

Item 16. The method of item 14, further comprising the step of crosslinking the optically clear pressure sensitive adhesive film to form a crosslinked optically clear pressure sensitive adhesive film.

Item 17. The method of item 16, further comprising the step of disposing the optically clear pressure sensitive adhesive film on an optical film to form an optically clear pressure sensitive adhesive laminate.

Item 18. The method of item 10, further comprising the step of applying the optically clear pressure sensitive adhesive laminate to an optical element to form an optical article.

Item 19. The method of item 18, further comprising crosslinking the optical article by exposure to UV irradiation.

Item 20. A pressure sensitive adhesive film comprising: an optically clear adhesive composition formed by polymerizing a mixture of monomers comprising at least one (C1-C18)alkyl (meth)acrylate monomer and at least one polar (meth)acrylate monomer; and surface-modified fumed silica disposed in the optically clear pressure sensitive adhesive composition; wherein the pressure sensitive adhesive film has a haze value in a range of 0 to 5% and a visible light transmittance value of 85 to 100%.

Item 21. A method of forming an optically clear pressure sensitive adhesive film comprising the steps of: polymerizing a mixture of monomers comprising at least one (C1-C18)alkyl (meth)acrylate monomer and at least one polar (meth)acrylate monomer; combining the pressure sensitive adhesive composition with a surface-modified fumed silica to form an optically clear pressure sensitive adhesive film.

EXAMPLES

TABLE 1

Materials

| Acronym | Name | Supplier | CAS Number |
|---------|------|----------|------------|
| ABP | Acryloyl benzophenone | Available from 3M Co., St. Paul, MN | |
| Acm | Acrylamide | Alfa Aesar | |
| BA | Butyl acrylate | Sigma Aldrich, St. Louis, MO | |
| C18A | 2-Octyl-1-decyl acrylate | Prepared following U.S. Pat. No. 8,137,807 | |

TABLE 1-continued

Materials

| Acronym | Name | Supplier | CAS Number |
|---|---|---|---|
| D1173 | 2-Hydroxy-2-methyl-phenyl-propane-1-one | TCI America | 7473-98-5 |
| DAAM | Diacetone acrylamide | TCI America | 2873-97-4 |
| 2-EHA | 2-ethylhexyl acrylate | Sigma Aldrich, St. Louis, MO | 103-11-7 |
| 2-EHMA | 2-Ethylhexyl methacrylate | Lucite International | |
| HBA | Hydroxybutyl acrylate | TCI America | |
| HDDA | Hexanediol diacrylate | Sigma Aldrich, St. Louis, MO | 13048-33-4 |
| HEA | Hydroxyethyl acrylate | Sigma Aldrich, St. Louis, MO | 818-61-1 |
| HPA | Hydroxypropyl acrylate | BASF | |
| I-184 | IRGACURE 184 | BASF | |
| I-651 | 2,2-Dimethoxy-1,2-diphenylethan-1-one | BASF | 24650-42-8 |
| IBOA | Isobornyl acrylate | Sartomer, Exton, PA | 5888-33-5 |
| IEM | Isocyanatylethyl methacrylate | ShowaDenko, Japan | |
| IOTG | Isooctyl thioglycolate | Sigma Aldrich, St. Louis, MO | |
| MEK | Methylethyl ketone | Exxon | |
| OAcm | tert-Octylacrylamide | HBC Chem Inc. | |
| PETMB | Pentaerythritol tetrakis(3-mercaptobutyrate), available under the trade designation "KARENZPE1" | ShowaDenko, Japan | |
| R200 | A hydrophilic fumed silica available under the trade designation "AEROSIL R200" | Evonik Industries, Essen, Germany | |
| R805 | A fumed silica aftertreated with an octylsilane, available under the trade designation "AEROSIL R805" | Evonik Industries, Essen, Germany | |
| R812 | A fumed silica aftertreated with hexamethyldisilazane, available under the trade designation "AEROSIL R812" | Evonik Industries, Essen, Germany | |
| R812s | A fumed silica aftertreated with hexamethyldisilazane, available under the trade designation "AEROSIL R812S" | Evonik Industries, Essen, Germany | |
| R816 | A fumed silica aftertreated with a hexadecylsilane, available under the trade designation AEROSIL R816" | Evonik Industries, Essen, Germany | |
| R972 | A fumed silica aftertreated with dimethyldichlorosilane, available under the trade designation "AEROSIL R972" | Evonik Industries, Essen, Germany | |
| S1800A | Isosteryl acrylate | Nagase America Corp. New York, NY | |
| TS-530 | A fumed silica aftertreated with a hexadecylsilane, available under the trade designation "CABOSIL TS530" | Cabot Corporation, Boston, MA | |
| V52 | VAZO 52 | DuPont, Wilmington, DE | |

Test Methods

Test Method 1. Haze Measurement

Haze measurements were made on a HunterLab (Reston, Va.) ULTRASCANPRO Instrument in transmission mode. OCA samples were cut to approximately 5 cm length by 10 cm length. One of the carrier liners was removed and the sample was laminated to a clear piece of 1 mm thick glass. The other liner was then removed and the sample was placed in the ULTRASCANPRO to measure transmission and haze though the OCA and glass assembly.

Test Method 2. Dynamic Mechanical Analysis

Dynamic mechanical analysis (DMA) was accomplished using an AR2000 PARALLEL PLATE RHEOMETER (TA Instruments) to characterize the physical properties of each sample as a function of temperature. For each sample, approximately 0.5 g of material was centered between 8 mm diameter parallel plates of the rheometer and compressed until the edges of the sample were uniform with the edges of the top and bottom plates. The furnace doors that surround the parallel plates and shafts of the rheometer were shut and the temperature was raised to 140° C. and held for 5 minutes. The temperature was then ramped from 120° C. to −20° C. at 3° C./min while the parallel plates were oscillated at a frequency of 1 Hz and a constant % strain of 0.4%. While many physical parameters of the material are recorded during the temperature ramp, storage modulus (G'), loss modulus (G"), and tan delta are of primary importance in the characterization of the homopolymers of this disclosure.

The glass transition temperature, Tg, of the adhesive composition can be measured by first determining its storage (G') and loss shear moduli (G"). The ratio of G"/G', a unit less parameter typically denoted "tan delta", was plotted versus temperature. The maximum point (point where the slope was zero) in the transition region between the glassy region and the rubbery region of the tan delta curve (if well defined) determined the Tg of the adhesive composition at that particular frequency.

Test Method 3. Elongation Using Probe Tack Tester

Elongation was measured using a TA XT PLUS TEXTURE ANALYZER (Texture Technologies Corp., Scarsdale, N.Y.). One liner of the pressure sensitive adhesive film was removed and the film was laminated onto a glass slide which was then fixed down onto the testing platform using physical restraints. The second liner on the adhesive was then removed and a hemispherical glass probe with a diameter of 7 mm was used to indent the adhesive film at a rate of 1 mm/sec with an applied force of 100 g. The probe was in contact with the adhesive for 60 seconds upon which time it was then removed at a speed of 0.5 mm/sec. The peak force recorded during this debonding process was recorded as well as the total elongation of the film before detachment from the probe. Elongation was calculated using the following equation Elongation (%)=((Final length−initial length)/film thickness)*100

Test Method 4: Stress Relaxation (SR)

Stress relaxation at 25° C. was measured using a TA XT PLUS TEXTURE ANALYZER (Texture Technologies Corp., Scarsdale, N.Y.). One liner of the pressure sensitive adhesive film was removed and the film was laminated onto a glass slide which was then fixed down onto the testing platform using physical restraints. The second liner on the adhesive was then removed and a hemispherical glass probe with a diameter of 7 mm was used to indent the adhesive film at a rate of 1 mm/sec with an applied force of 100 g. The probe was in contact with the adhesive at this constant depth for 120 seconds. The initial force after the probe had impacted the adhesive as well as the force on the probe head at 120 seconds was recorded and the % stress relaxation of the material was calculated using the following equation:

SR=1−((Force Initial−Force 120 sec)/Force Initial)*100

Stress relaxation at 70° C. was measured using an AR2000 PARALLEL PLATE RHEOMETER (TA Instruments). For each sample, approximately 0.5 g of material was centered between 8 mm diameter parallel plates of the rheometer and compressed until the edges of the sample were uniform with the edges of the top and bottom plates. The furnace doors that surround the parallel plates and shafts of the rheometer were shut and the temperature was raised to 70° C. and held for 5 minutes. A rotational strain of 10% was placed on the sample and held. The dissipation of force on the transducer head was recorded over a period of 300 seconds from the initial strain and the % stress relaxation of the material was calculated using the following equation:

SR=1−((Force 0.01 sec−Force 300 sec)/Force 0.01 sec)*100

Test Method 5. Lamination (Ink Wetting Capability)

The adhesive film samples with two removable liners were cut into a 46×71 mm piece. Using tape tabs on the "tight" liner side of the cut sample to hold the sample, another piece of tape was used to remove the "easy" side liner. After removal of the liner, the sample was rolled onto a 50×75×0.7 mm LCD glass slide. The tight liner remains on at this time. A TAKATORI VACUUM LAMINATOR was used to attach the 50×75×0.7 mm slide with the adhesive sample on it to a 55×80 mm piece of glass that has a printed ink border on it with printed features of 75 micrometer thickness. The LCD glass with adhesive was placed in the top station of the Laminator, while the printed glass was placed on the bottom station. Placement was set so that when the two glasses are joined together, the LCD glass, which was smaller, was centered in the printed glass. The Laminator settings were as follows. 0.2 MPa of laminating pressure, 100 Pa of vacuum, 2 second dwell time, all done at room temperature. The top station of the laminator was then closed, the start button was pushed and the cycle was initiated to follow the conditions above. After the laminator reached the desired vacuum level and dwell time, a sound was made by the machine which indicated that the cycle was done. The sample was then removed. Each sample was autoclaved for 30 minutes at 60° C., after which bubbles formed during lamination were counted. Samples were then conditioned at room temperature for 24 hours and additional formed bubbles were counted and recorded.

Test Method 6: Liner Release Force Measurement

The average release force required to peel a release liner from an adhesive was measured using a MODEL SP-2100 SLIP/PEEL TESTER commercially available from IMASS, Inc., Accord, Mass., at a 180-degree peel angle and a speed of 90 in/min (229 cm/min). The test sample was a three-layer adhesive article: an easy liner, an adhesive layer and a tight liner. The adhesive layer of the structure had dimension of 6.5 inch (16.5 cm)×8.1 inch (20.6 cm) and the easy liner had a dimension of 6.7 inch (17.0 cm)×8.6 inch (21.8 cm), with the easy liner's extended portion evenly distributed around the adhesive. Test samples were stored at room temperature for 14 days at 23° C./50% RH before being tested. When measuring the release force of an "easy" release liner, the tight release liner was mounted on the stage of the Slip/Peel Tester and the release force of the easy liner was measured during the peel test. To measure the release force of the tight release liner, the easy release liner was removed and the exposed adhesive was mounted directly to the stage of the SLIP/PEEL TESTER. The tight release liner was then removed during the peel test and the corresponding peel force was measured.

Preparation of Optically Clear Adhesive Film Examples

To evaluate the compatibility between a series of hydrophilic and hydrophobic fumed silica particles with OCA monomers a number of formulations were prepared as shown in Table 2 below. Each formulation was mixed in a 16 oz. glass jar using a 2 inch (~5.1 cm) diameter COWLES blade mixer on a rotary motor with variable speed control rpm. After the monomers were added to the jar, the surface-modified fumed silica was pre-weighed according to Table 2 and then slowly added as the COWLES blade rotated at a speed of 300 rpm. After all of the particles had been submerged within the monomer formulation, the cowels blade speed was increased to 900 rpm for 10 minutes to adequately disperse the particles within the formulation. Each sample was allowed to sit overnight to observe any settling of the particles and then the visual appearance of the jar was recorded in Table 2 below.

TABLE 2

Visual Appearance of OCA monomer formulations with hydrophobic/hydrophilic silica

| Sample | 2-EHA (g) | DAAM (g) | HEA (g) | R200 (g) | R972 (g) | R812 (g) | R805 (g) | TS-530 (g) | R816 (g) | Visual Appearance | Particle Settling |
|---|---|---|---|---|---|---|---|---|---|---|---|
| PE1 | 210 | 30 | 70 | 20 | 0 | 0 | 0 | 0 | 0 | Hazy paste | Yes |
| PE2 | 210 | 30 | 70 | 0 | 30 | 0 | 0 | 0 | 0 | Hazy liquid | Yes |
| PE3 | 210 | 30 | 70 | 0 | 0 | 30 | 0 | 0 | 0 | Clear liquid | No |
| PE4 | 210 | 30 | 70 | 0 | 0 | 0 | 30 | 0 | 0 | Hazy liquid | Yes |
| PE5 | 210 | 30 | 70 | 0 | 0 | 0 | 0 | 30 | 0 | Clear liquid | No |
| PE6 | 210 | 30 | 70 | 0 | 0 | 0 | 0 | 0 | 30 | Hazy paste | Yes |

Monomer formulation A (MFA) was prepared by mixing 371 g of 2-EHA, 106 g of HEA and 53 g of DAAM with 0.106 g of D1173 photoinitiator. This sample was purged with nitrogen and exposed to low intensity (0.3 mW/cm$^2$) UV (360 nm) LED light until a coatable viscosity (~1000 cPs) was achieved. The polymerization was halted by turning off the LED light and purging with oxygen gas. Sample A was then mixed in various amounts with PE3 and PE5 in Table 2 above to give targeted amounts of R812 and TS-530 particles respectively in each formulation as shown below in Table 3. PETM chain transfer agent, HDDA crosslinker, and I-651 photoinitiator was then added to the formulation as indicated in Table 3 and allowed to mix overnight. Each viscous polymer solution from Table 3 was then coated between release liners RF02N (Nippa Corporation, Osaka, Japan; 2 mil; ~51 micrometers) and A3 (3 mil; ~76 micrometers), using a knife coater with a set gap to yield a PSA coating thickness of 10 mils (~254 micrometers). This construction was then irradiated with UV light to give a total dose of 1000 mJ/cm$^2$. Haze values were measured for each OCA film following Test Method 1 above and recorded in Table 3. In this table it was evident that even high loadings of particles 8 pphr was achieved without a significant compromise in optical clarity with all samples having less than 2% haze.

TABLE 3

Visual Appearance of OCA monomer formulations with hydrophobic silica

| Example | MFA (g) | PE3 (g) | PE5 (g) | PETMB (g) | HDDA (g) | I-651 (g) | Target R812 (pphr) | Target TS-530 (pphr) | Haze (%) |
|---|---|---|---|---|---|---|---|---|---|
| CE1 | 70 | 0 | 0 | 0.175 | 0.056 | 0.14 | 0 | 0 | 0.06 |
| E1 | 63 | 7 | 0 | 0.175 | 0.056 | 0.14 | 2 | 0 | 0.18 |
| E2 | 56 | 14 | 0 | 0.175 | 0.056 | 0.14 | 4 | 0 | 0.24 |
| E3 | 42 | 28 | 0 | 0.175 | 0.056 | 0.14 | 6 | 0 | 0.31 |
| E4 | 14 | 56 | 0 | 0.175 | 0.056 | 0.14 | 8 | 0 | 0.43 |
| E5 | 63 | 0 | 7 | 0.175 | 0.056 | 0.14 | 0 | 2 | 0.38 |
| E6 | 56 | 0 | 14 | 0.175 | 0.056 | 0.14 | 0 | 4 | 0.76 |
| E7 | 42 | 0 | 28 | 0.175 | 0.056 | 0.14 | 0 | 6 | 1.17 |
| E8 | 14 | 0 | 56 | 0.175 | 0.056 | 0.14 | 0 | 8 | 1.92 |

Additional OCA films were prepared following compositions in Table 4 below. In Comparative Example 2, 241.5 g of 2-EHA, 66.5 g of HEA, 42 g of DAAM, and 0.07 g of D1173 photoinitiator was mixed. This sample was purged with nitrogen and exposed to low intensity (0.3 mW/cm$^2$) UV (360 nm) LED light until a coatable viscosity (~1000 cPs) was achieved. The polymerization was halted by turning off the LED light and purging with oxygen gas. PE1 chain transfer agent, HDDA crosslinker, and I-651 photoinitiator was then added to the formulation as indicated in Table 4 and allowed to mix overnight. Each viscous polymer solution from Table 3 was then coated between 2 mil (~51 micrometers) release liners, RF02N and A3, using a knife coater with a set gap to yield a PSA coating thickness of 10 mils (~254 micrometers). This construction was then irradiated with UV light to give a total dose of 1000 mJ/cm$^2$. Examples 9-12 follow this same procedure with the exception that fumed silica was mixed into each formulation as indicated in Table 4 prior to the first UV treatment. Hydrophobic fumed silica was blended into each monomer formulation using similar methods to those described above.

TABLE 4

OCA films generated with varying amounts of R812s hydrophobic fumed silica

| Example | 2-EHA (g) | HEA (g) | DAAM (g) | R812s (g) | D1173 (g) | PETMB (g) | HDDA (g) | I-651 (g) |
|---|---|---|---|---|---|---|---|---|
| CE2 | 241.5 | 66.5 | 42 | 0 | 0.07 | 0.25 | 0.075 | 0.51 |
| E9 | 345 | 95 | 60 | 10 | 0.1 | 0.26 | 0.075 | 0.9 |
| E10 | 345 | 95 | 60 | 20 | 0.1 | 0.26 | 0.075 | 0.9 |
| E11 | 345 | 95 | 60 | 30 | 0.1 | 0.26 | 0.075 | 0.9 |
| E12 | 345 | 95 | 60 | 40 | 0.1 | 0.26 | 0.075 | 0.9 |

Elongation and stress relaxation (SR) was measured as indicated in Test Methods 3 and 4 respectively. Furthermore, room temperature modulus (G') and Tg were measured using Test Method 3 above, and all data was recorded in Table 5 below. It was evident from Table 5 that the particle loading had an immediate effect on reducing the elongation of each sample as well as increasing the room temperature modulus of the OCA which was expected to greatly enhance the workability and handle-ability of the OCA film. However, the particle loading did not negatively affect the ability of the film to dissipate stress, affect the Tg, or worsen the ability of the OCA to laminate to a 75 micrometer ink step without bubbling, as shown in Table 5.

TABLE 5

Optical and Physical Properties of OCA Films with Hydrophobic Silica

| Example | Particle Loading (pph) | Elongation (mm) | SR @ 25° C. (%) | G' @ 25° C. (KPa) | Tg (°K) | Lamination Performance Bubbles after autoclave | Bubbles after 24 hr dwell |
|---|---|---|---|---|---|---|---|
| CE2 | 0 | 1236 | 91.8 | 75.8 | 268.0 | 0 | 0 |
| E9 | 2 | 1032 | 92.3 | 95.6 | 268.2 | 0 | 0 |
| E10 | 4 | 1092 | 92.7 | 115.5 | 268.5 | 0 | 0 |
| E11 | 6 | 988 | 91.9 | 155.0 | 268.2 | 0 | 0 |
| E12 | 8 | 880 | 90.0 | 213.0 | 268.5 | 0 | 0 |

Comparative OCA films were prepared following Table 6 below. In Comparative Example CE4, 16.5 g of 2-EHA, 6 g of HEA, 7.5 g of IBOA, and 0.009 g of D1173 photoinitiator was mixed. This sample was purged with nitrogen and exposed to low intensity (0.3 mW/cm²) UV (360 nm) LED light until a coatable viscosity (~1000 cPs) was achieved. The polymerization was halted by turning off the LED light and purging with oxygen gas. 0.09 g of PE1 chain transfer agent, 0.03 g of HDDA crosslinker (0.1 pph), and 0.06 g of I-651 photoinitiator was then added to the formulation and allowed to mix overnight. Comparative examples 5 and 6 were made in a similar manner with the only exception being a higher loading of HDDA crosslinker as indicated in Table 6. Each viscous polymer solution from Table 6 was then coated between 2 mil (~51 micrometers) release liners, RF02N (Nippa Corporation, Osaka, Japan) and A3, using a knife coater with a set gap to yield a PSA coating thickness of 10 mils. This construction was then irradiated with UV light to give a total dose of 1000 mJ/cm². Elongation, stress relaxation, and lamination performance was measured using Test Methods 3-5 above.

TABLE 6

Comparative Examples Using Crosslinker To Decrease Elongation

| Example | HDDA (pph) | Elongation (mm) | SR @ 25° C. (%) | Lamination Performance Bubbles after autoclave | Add. bubbles after 24 hr dwell |
|---|---|---|---|---|---|
| CE4 | 0.1 | 1837 | 91.8 | 0 | 0 |
| CE5 | 0.2 | 1001 | 80.1 | 22 | 11 |
| CE6 | 0.3 | 484 | 72.8 | 24 | 10 |

Increasing crosslinker lead to the desired decrease in elongation as shown above in Table 6. However, unlike the particle addition, increasing crosslinker detrimentally changed the stress relaxation of the material as well as its ability to laminate to a 75 micrometer ink step without bubble formation.

To evaluate the compatibility between a series of hydrophobic silica particles with OCA monomers with longer alkyl chains, a number of formulations were prepared as shown in Table 7 below. Each formulation was mixed in a 16 oz. glass jar using a COWLES blade mixer on a rotary motor with variable speed control rpm. After the monomers were added to the jar, surface-modified fumed silica was pre-weighed according to Table 7 and then slowly added as the COWLES blade rotated at a speed of 300 rpm. After all of the particles had been submerged within the monomer formulation, the cowels blade speed was increased to 900 rpm for 10 minutes to adequately disperse the particles within the formulation. Each sample was allowed to sit overnight to observe any settling of the particles and then the visual appearance of the jar was recorded in Table 7 below.

TABLE 7

Visual appearance of OCA monomer formulations with hydrophobic silica

| Example | C18A (g) | S1800A | OAcm | HBA | R972 | R812 | R805 | TS-530 | R816 | Visual Appearance | Particle Settling |
|---|---|---|---|---|---|---|---|---|---|---|---|
| PE7 | 75 | 135 | 30 | 60 | 12 | 0 | 0 | 0 | 0 | Hazy liquid | Yes |
| PE8 | 75 | 135 | 30 | 60 | 0 | 12 | 0 | 0 | 0 | Hazy liquid | No |
| PE9 | 75 | 135 | 30 | 60 | 0 | 0 | 12 | 0 | 0 | Clear liquid | No |

TABLE 7-continued

Visual appearance of OCA monomer formulations with hydrophobic silica

| Example | C18A (g) | S1800A | OAcm | HBA | R972 | R812 | R805 | TS-530 | R816 | Visual Appearance | Particle Settling |
|---|---|---|---|---|---|---|---|---|---|---|---|
| PE10 | 75 | 135 | 30 | 60 | 0 | 0 | 0 | 12 | 0 | Hazy liquid | Yes |
| PE11 | 75 | 135 | 30 | 60 | 0 | 0 | 0 | 0 | 12 | Hazy liquid | Yes |

Additional OCA films were prepared using longer chain acrylates following Table 8 below. In Comparative Example CE7, 125 g of C18A, 225 g of S1800A, 50 g of OAcm, 100 g of HBA, and 0.1 g of D1173 photoinitiator was mixed. This sample was purged with nitrogen and exposed to low intensity (0.3 mW/cm$^2$) UV (360 nm) LED light until a coatable viscosity (~1000 cPs) was achieved. The polymerization was halted by turning off the LED light and purging with oxygen gas. PE1 chain transfer agent, HDDA crosslinker, and I-651 photoinitiator was then added to the formulation as indicated in Table 8 and allowed to mix overnight. The viscous polymer solution from Table 8 was then coated between 2 mil release liners, RF02N (Nippa Corporation, Osaka, Japan) and A3, using a knife coater with a set gap to yield a PSA coating thickness of 10 mils (~254 micrometers). This construction was then irradiated with UV light to give a total dose of 1000 mJ/cm$^2$.

TABLE 8

OCA films generated with R805 hydrophobic silica

| Example | C18A (g) | S1800A (g) | OAcm (g) | HBA (g) | R805 (g) | PETMP (g) | HDDA (g) | ABP (g) | I-651 (g) |
|---|---|---|---|---|---|---|---|---|---|
| CE7 | 125 | 225 | 50 | 100 | 0 | 1.5 | 0.15 | 1.5 | 1.5 |
| E13 | 125 | 225 | 50 | 100 | 20 | 1.5 | 0.15 | 1.5 | 1.5 |

Elongation and stress relaxation (SR) was measured as indicated in Test Methods 3 and 4 respectively. Furthermore, plateau modulus (G') and Tg were measuring using Test Method 2 as well as lamination performance as described in Test Method 5 above and all data was recorded in Table 9 below. Again, a significant increase in modulus was achieved with only 4% addition of AEROSIL R805 particles into the OCA formulation which was expected to significantly improve the diecut-ability of this material. This addition of particles had little negative impact on the haze, stress relaxation, Tg, and lamination performance of the material, as shown in Table 9 below.

TABLE 9

Optical and physical properties of OCA films with hydrophobic silica

| Example | Particle Loading (PPh) | Haze 10 mil (%) | SR @ 70° C. (%) | G' @ 25° C. (KPa) | Lamination Performance | |
|---|---|---|---|---|---|---|
| | | | | | Bubbles after autoclave | Bubbles after 24 hr dwell |
| CE7 | 0 | 0.11 | 95.5 | 87.5 | 0 | 0 |
| E13 | 4 | 0.38 | 98.9 | 130.0 | 0 | 0 |

Monomer formulation B (MFB) was prepared by mixing 414 g of 2-EHA, 114 g of HEA and 72 g of DAAM with 0.106 g of D1173 photoinitiator in a 32 oz jar. This sample was purged with nitrogen and exposed to low intensity (0.3 mW/cm$^2$) UV (360 nm) LED light until a coatable viscosity (~1000 cPs) was achieved. The polymerization was halted by turning off the LED light and purging with oxygen gas. 1.5 g of PE1 chain transfer agent, 0.24 g HDDA crosslinker, 1.28 g of ABP, and 1.8 g of I-651 photoinitiator was then added to the MFB formulation allowed to mix overnight. Monomer formulation C (MFC) was prepared by mixing 414 g of 2-EHA, 114 g of HEA and 72 g of DAAM with 52.2 g of AEROSIL R812 hydrophobic silica. The formulation was mixed in a 32 oz. glass jar using a 2 inch (~5.1 cm) diameter COWLES blade mixer on a rotary motor with variable speed control rpm. After the monomers were added to the jar, surface-modified fumed silica was pre-weighed according to Table 10 and then slowly added as the COWLES blade rotated at a speed of 300 rpm. After all of the particles had been submerged within the monomer formulation, the cowels blade speed was increased to 900 rpm for 10 minutes to adequately disperse the particles within the formulation. 1.5 g of PE1 chain transfer agent, 0.24 g HDDA crosslinker, 1.28 g of ABP, and 1.8 g of I-651 photoinitiator was then added to the MFC formulation and allowed to mix overnight. MFB and MFC were mixed according to Table 10 below to give the target particle loading in each formulation.

Each viscous polymer solution from Table 10 was then coated between release liners, RF02N (Nippa Corporation, Osaka, Japan; 2 mil; ~51 micrometers) and A3 (3 mil; ~76 micrometers), using a knife coater with a set gap to yield a PSA coating thickness of 6 mils. This construction was then irradiated with UV light to give a total dose of 1000 mJ/cm$^2$. Release force as the OCA was removed from the A3 liner was measured according to Test Method 6 above and recorded in Table 10 below. It was evident that even small loadings of R812 particles into this OCA formulation was able to significantly decrease the liner removal force, which could benefit the handle-ability of die-cut parts of this material.

TABLE 10

Effect of Hydrophobic Particle Loading on OCA Release Force from Tight Liner

| Example | MFB (%) | MFC (%) | R812 Particle Loading (%) | Average Release Force from Tight A3 Liner (gf/cm) |
|---|---|---|---|---|
| CE7 | 100 | 0 | 0 | 43.01 |
| E14 | 88 | 12 | 1 | 38.55 |

TABLE 10-continued

Effect of Hydrophobic Particle Loading on OCA Release Force from Tight Liner

| Example | MFB (%) | MFC (%) | R812 Particle Loading (%) | Average Release Force from Tight A3 Liner (gf/cm) |
|---|---|---|---|---|
| E15 | 77 | 23 | 2 | 34.68 |
| E16 | 50 | 50 | 4 | 31.13 |

Additional OCA films were generated using the formulations in Table 11 below. For Comparative Example 8, 90 g of 2-EHA, 18 g of 2-EHMA, 36 g of BA, 32.4 g of HPA, 3.6 g Acm, 0.1 g of V52, and 120 g MEK were charged to a reactor vessel. This vessel was sparged with nitrogen for 5 minutes, sealed, and then placed in an agitated water bath at 60 C for 20 hours. The mixture was then cooled, sparged with air for 10 minutes, and 1.28 g of IEM was added to the vessel. The vessel was again sealed and heated to 50° C. for 12 hours to allow for the IEM to react with pendant OH functionality on the formed acrylic polymer. Following this functionalization, 0.72 g of I-184 was added to CE8. For Examples 17-19 below, 45 g of AEROSIL R812 dry particles was added to 255 g of methoxypropanol and mixed using a high speed mixer fitted with a COWLES blade for high shear mixing for 30 minutes. The R812 solution was then added to polymer solution of CE8 to yield the desired amount of R812 particles in the formulation. These solutions were rotated to mix the components for 24 hours before coating.

TABLE 11

OCA Films Generated with Fumed Silica Particles

| Example | 2-EHA (g) | 2-EHMA (g) | BA (g) | HPA (g) | Acm (g) | V52 (g) | TDDM (g) | MEK (g) | IEM (g) | I-184 (g) | R812 (g) | Methoxy propanol (g) |
|---|---|---|---|---|---|---|---|---|---|---|---|---|
| CE8 | 90 | 18 | 36 | 32.4 | 3.6 | 0.1 | 0.045 | 120 | 1.28 | 0.72 | 0 | 80 |
| E17 | 90 | 18 | 36 | 32.4 | 3.6 | 0.1 | 0.045 | 120 | 1.28 | 0.72 | 11.5 | 65.1 |
| E18 | 90 | 18 | 36 | 32.4 | 3.6 | 0.1 | 0.045 | 120 | 1.28 | 0.72 | 15.7 | 89 |
| E19 | 90 | 18 | 36 | 32.4 | 3.6 | 0.1 | 0.045 | 120 | 1.28 | 0.72 | 24.5 | 138.8 |

Each solution in Table 11 was coated onto RF02N release liner (Nippa Corporation, Osaka, Japan) and dried at 70° C. for 20 minutes to remove solvent and yield a 75 micrometer dry coating of adhesive. Sample coatings from Table 11 were each laminated together multiple times to result in a 1000 micrometer coating of the material and then placed between 8 mm diameter parallel plates of a DHR rheometer (TA instruments). Storage Modulus (G') was measured as a function of temperature as described in Test Method 2, with results as summarized in Table 12.

TABLE 12

Storage Modulus at 25° C.

| Example | R812 (%) | G' @ 25° C. (Pa) |
|---|---|---|
| CE8 | 0 | 41,900 |
| E17 | 6 | 102,800 |
| E18 | 8 | 109,200 |
| E19 | 12 | 161,700 |

Sample coatings from Table 11 were each laminated together once to form a 150 micrometer adhesive coating. This adhesive coating was then evaluated for ink wettability according to Test Method 6 and Haze according to Test Method 1, with results as summarized in Table 13.

TABLE 13

Optical Properties and Lamination Performance of OCA Films with Hydrophobic Silica

| Example | R812 Loading (%) | Haze (%) | Lamination Performance Bubbles after autoclave | Bubbles after 24 hr dwell |
|---|---|---|---|---|
| CE8 | 0 | 0.14 | 0 | 0 |
| E17 | 6 | 0.23 | 0 | 0 |
| E18 | 8 | 0.19 | 0 | 0 |
| E19 | 12 | 0.19 | 0 | 0 |

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A pressure sensitive adhesive article comprising:
   a substrate;
   a pressure sensitive adhesive film disposed on the substrate;
   wherein:
   the pressure sensitive adhesive film comprises:
      an optically clear adhesive composition formed by polymerizing a mixture of monomers comprising at least one (C1-C18)alkyl (meth)acrylate monomer and at least one polar (meth)acrylate monomer; and
      particles consisting of hydrophobic surface-modified fumed silica disposed in the optically clear pressure sensitive adhesive composition, the hydrophobic surface-modified fumed silica being present at 4 wt-% to 70 wt-%, relative to a total weight of the of the pressure sensitive adhesive film;
   wherein the pressure sensitive adhesive film has a haze value in a range of 0 to 3%, a visible light transmittance value of 85 to 100%, and exhibits a storage modulus of 102 kPa to 213 kPa at 25° C.

2. The pressure sensitive adhesive article of claim 1, wherein the pressure sensitive adhesive film has a haze value of 0% to 1%.

3. The pressure sensitive adhesive article according to claim 1, wherein the surface-modified fumed silica comprises alkylsilane surface-modifying groups.

4. The pressure sensitive adhesive article of claim 3, wherein the alkylsilane surface-modifying groups comprise one or more of a methyl group, an octyl group, or a decyl group.

5. The pressure sensitive adhesive article according to claim 1, wherein the surface-modified fumed silica is present in a range from 4 wt. % to 60 wt. % relative to a total weight of the of the pressure sensitive adhesive film.

6. The pressure sensitive adhesive article of claim 1, wherein the mixture of monomers comprises:
   50 wt. % to 94 wt. % of the at least one (C1-C18)alkyl (meth)acrylate monomer;
   5 wt. % to 30 wt. % of the at least one polar (meth)acrylate monomer; and
   1 wt. % to 20 wt. % of a (meth)acrylamide;
wherein each weight percentage of monomer is relative to a total weight of monomers in the mixture of monomers.

7. The pressure sensitive adhesive article of claim 1, wherein the substrate is a release liner.

8. The pressure sensitive adhesive article of claim 1, wherein the hydrophobic surface-modified fumed silica is present in a range from 4 wt. % to 12 wt. % relative to the total weight of the of the pressure sensitive adhesive film.

* * * * *